(12) United States Patent  (10) Patent No.: US 8,708,622 B2
Weber  (45) Date of Patent: Apr. 29, 2014

(54) GEARWHEEL CUTTING MACHINE HAVING VIBRATION DAMPING

(75) Inventor: Jürgen Weber, Hückeswagen (DE)

(73) Assignee: Klingelnberg AG (CH)

( * ) Notice: Subject to any disclaimer, the term of this patent is extended or adjusted under 35 U.S.C. 154(b) by 973 days.

(21) Appl. No.: 12/792,248

(22) Filed: Jun. 2, 2010

(65) Prior Publication Data

US 2010/0310333 A1 Dec. 9, 2010

(30) Foreign Application Priority Data

Jun. 3, 2009 (DE) .................... 20 2009 007 821 U

(51) Int. Cl.
*B23F 23/06* (2006.01)

(52) U.S. Cl.
USPC ............................................ 409/62; 409/141

(58) Field of Classification Search
USPC .............. 409/62, 141, 143, 61; 279/157, 158, 279/102, 103, 136; 408/143
See application file for complete search history.

(56) References Cited

U.S. PATENT DOCUMENTS

| | | | | |
|---|---|---|---|---|
| 2,484,027 A | * | 10/1949 | Haffey | 279/16 |
| 2,570,752 A | * | 10/1951 | Benjamin et al. | 279/16 |
| 3,360,276 A | * | 12/1967 | Peffer | 279/2.03 |
| 4,875,693 A | * | 10/1989 | Nowak et al. | 279/2.12 |
| 5,593,258 A | * | 1/1997 | Matsumoto et al. | 409/234 |
| 5,975,816 A | * | 11/1999 | Cook | 409/131 |
| 6,109,842 A | * | 8/2000 | Cook | 409/131 |
| 6,382,888 B2 | * | 5/2002 | Cook | 409/141 |
| 6,729,627 B2 | * | 5/2004 | Komine et al. | 279/157 |
| 7,017,919 B2 | * | 3/2006 | Matsumoto et al. | 279/9.1 |
| 2003/0047888 A1 | * | 3/2003 | Hahn | 279/19.1 |
| 2009/0155010 A1 | * | 6/2009 | Cook | 409/232 |

* cited by examiner

*Primary Examiner* — Jermie Cozart

(74) *Attorney, Agent, or Firm* — McCormick Paulding Huber LLP

(57) ABSTRACT

Gearwheel cutting machine for machining the tooth flanks of gearwheels (1), comprising chucking means (20) for chucking a workpiece (1) to be machined; a gear cutting tool; and a flat, ring-shaped vibration-damping element (21) insertable in the area of the chucking means (20) during the chucking of the workpiece (1) to be machined, the ring-shaped vibration-damping element (21) being provided in order to suppress or damp vibrations.

4 Claims, 3 Drawing Sheets

US 8,708,622 B2

GEARWHEEL CUTTING MACHINE HAVING VIBRATION DAMPING

CROSS REFERENCE TO RELATED APPLICATION

The present application claims the priority of the German utility model DE202009007821.3, the application for which was filed on Jun. 3, 2009.

FIELD OF THE INVENTION

The invention relates to gearwheel cutting machines for machining gearwheels.

BACKGROUND OF THE INVENTION

During the machining of gearwheels, waviness typically arises on the surfaces of the tooth flanks, whose roughness is typically in the micrometer range. The effort which must be taken to post-process the tooth flanks is frequently relatively great.

Therefore, the invention is based on the problem of offering a solution which allows the described waviness of the tooth flanks to be prevented or reduced during the machining of gearwheels using gear cutting tools.

SUMMARY OF THE INVENTION

This problem is solved according to the invention in that a flat, ring-shaped vibration-damping element is inserted in the area of the chucking means, during the chucking of the workpiece to be machined, as the only connection between a first planar, ring-shaped flange formed on a lug part and a second planar, ring-shaped flange surface formed on a gearwheel receptacle.

The invention is based on experimental results which have shown after detailed analysis that the described waviness arises in that the machine and/or the chuck of the workpiece enter an excitation state during the machining. In this excitation state, very small vibrations or offsets result between the gear cutting tool and the workpiece, which in turn results in the formation of the waviness.

The invention begins at this point, in that it prevents or strongly damps these excitation states through the insertion of an elastic element in the chuck.

Further advantageous embodiments may be inferred from the disclosure.

BRIEF DESCRIPTION OF THE DRAWINGS

Exemplary embodiments of the invention are described in greater detail hereafter with reference to the drawings. In the figures.

DESCRIPTION OF THE PREFERRED EMBODIMENTS

Terms are used in connection with the present description which are also used in relevant publications and patents. However, it is to be noted that the use of these terms is only to serve for better understanding. The ideas according to the invention and the protective scope of the patent claims are not to be restricted in their extent by the specific selection of the terms. The invention may be readily transferred to other term systems and/or technical fields. The terms are to be applied accordingly in other technical fields.

Figure 1:
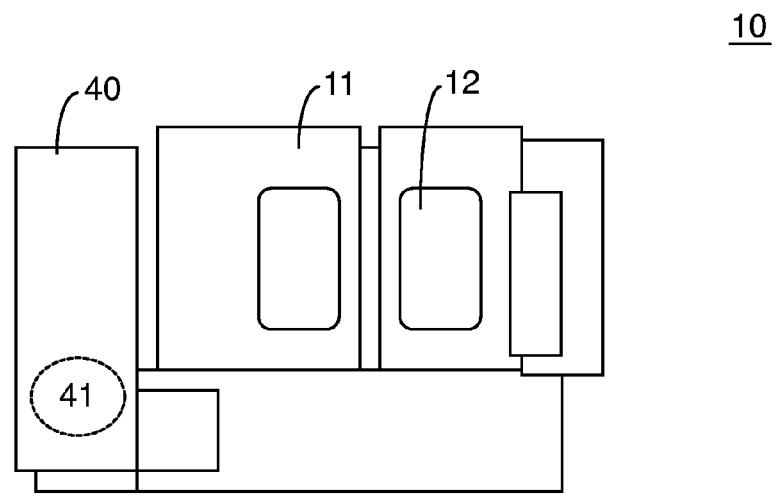
FIG. 1 shows a schematic front view of a gear cutting machine, in which the damping means according to the invention can be used.

A schematic view of a (gearwheel cutting) machine 10 according to the invention is shown in FIG. 1. The machine 10 is a gear cutting machine. The actual machining space in which gearwheels are machined is located behind a panel 11 having viewing window 12. The controller 41 can be housed in the housing of the same machine 10 or in a separate housing 40.

The gearwheel cutting machine 10 is especially designed or machining the tooth flanks of gearwheels 1 and has chucking means 20 (see FIG. 2A, for example) for chucking a workpiece 1 to be machined. In addition, the gearwheel cutting machine 10 comprises tool chucking means for chucking a gear cutting tool for the machining of the tooth flanks. The gearwheel cutting machine 10 according to the invention is distinguished in that it comprises a flat, ring-shaped vibration-damping element 21, which is insertable in the area of the chucking means 20 during the chucking of the workpiece 1 to be machined.

Figure 2A:
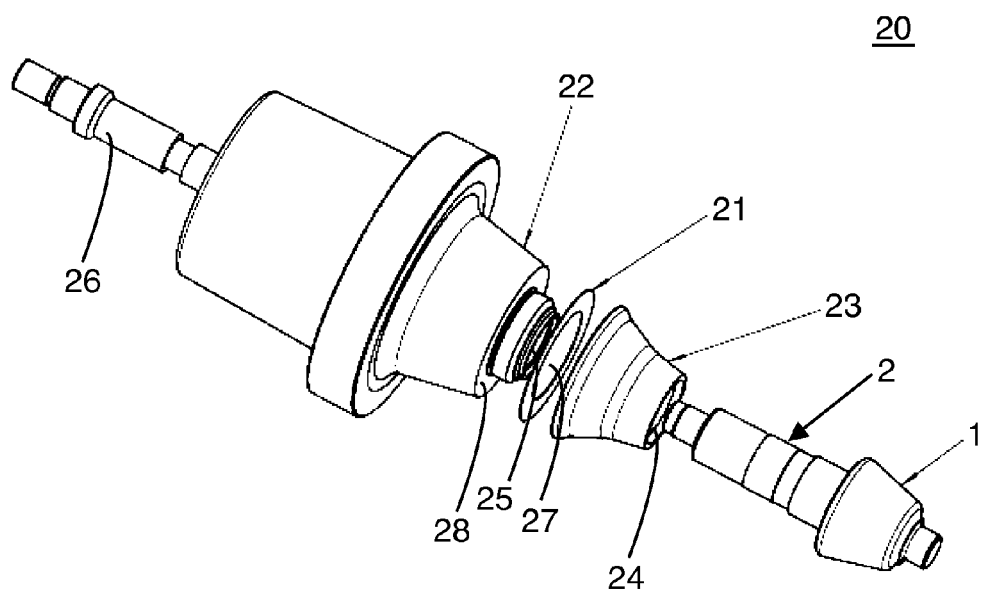
FIG. 2A shows a perspective exploded view of a chuck having damping means according to the invention.
Figure 2B:
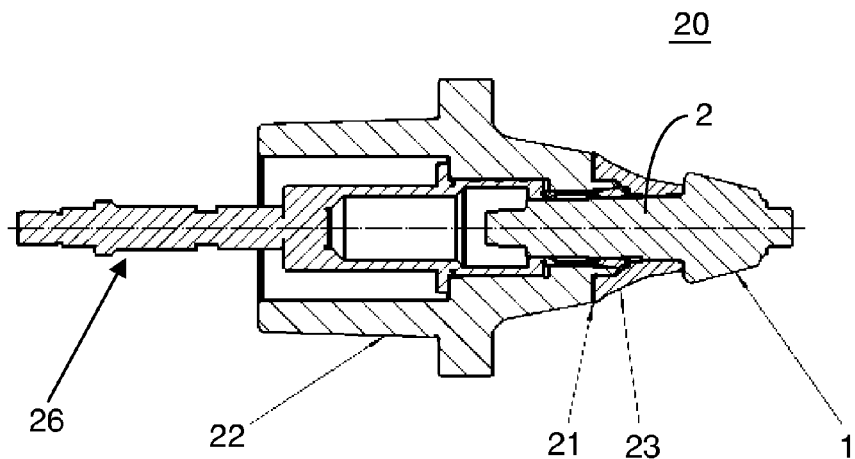
FIG. 2B shows a sectional view of the chuck having damping means according to the invention from FIG. 2A.
Figure 2C:
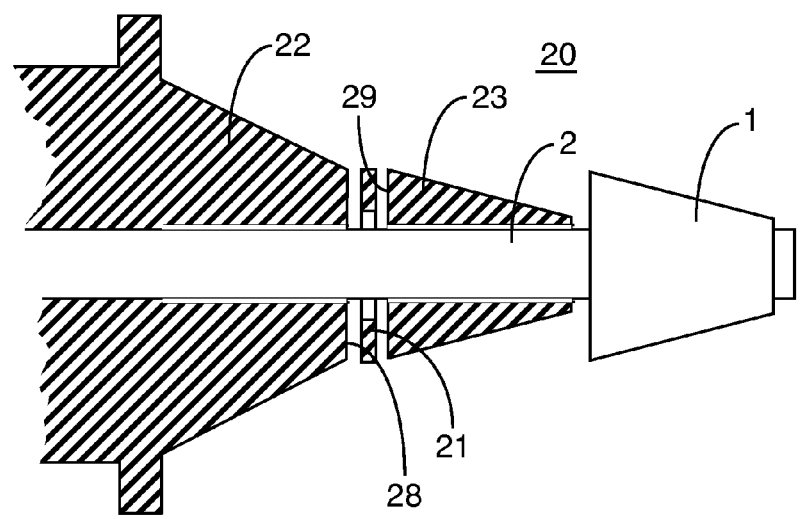
FIG. 2C shows a greatly simplified sectional view of the chuck having damping means according to the invention from FIG. 2B.

It may be seen in FIGS. 2A, 2B, and 2C that the chucking means 20 has a gearwheel receptacle 22 and a lug part 23, in order to be able to chuck a gearwheel 1 (a bevel gear pinion here). The gearwheel 1 has a shaft 2 here. The ring-shaped lug part 23 is pushed over the shaft 2 using its central hole 24. The vibration-damping element 21 is then placed on the same shaft 2 and the rear end of the shaft 2 is inserted into a central hole 25 of the pinion receptacle 22 and clamped therein. The chucking means 20 can be inserted as a whole using its rear spindle shaft 26, for example, into a spindle receptacle (not shown) of the machine 10 and fastened therein.

Both the lug part 23 and the gearwheel receptacle 22 have ring-shaped attachment flanges 28, 29 having planar ring surfaces (flange surfaces), as shown in FIG. 2C.

The vibration-damping element 21 is situated as the only connection between the ring-shaped flange surfaces 28, 29 and the lug part 23 is thus decoupled with respect to vibration from the pinion receptacle 22 and the gearwheel cutting machine 10.

Figure 4A:
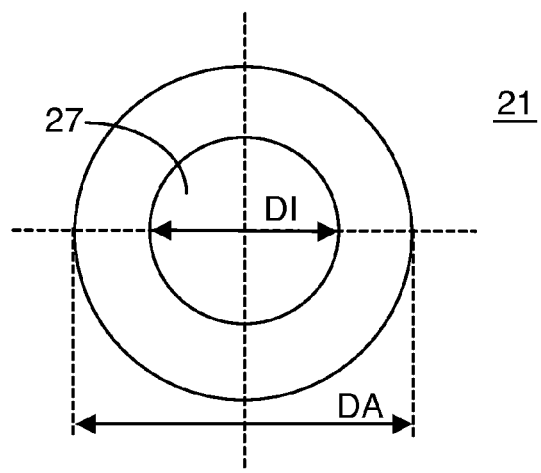
FIG. 4A shows a top view of damping means according to the invention.
Figure 4B:
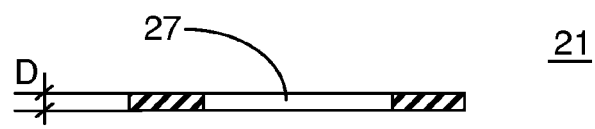
FIG. 4B shows a sectional view of the damping means according to the invention from FIG. 4A.

The vibration-damping element 21 has a ring shape having a central hole 27. The ratio between external diameter DA and internal diameter DI is $1.1 \leq DA/DI \leq 3.0$. The element 21 has a thickness D, which is between 0.5 and 2 mm. The thickness D of the vibration-damping element 21 is preferably between 0.75 mm and 0.50 mm. The corresponding dimensions are shown in FIGS. 4A and 4B.

The vibration-damping element 21 is preferably manufactured from a heat-resistant and moisture-resistant material, because high temperatures may arise during the machining and lubricants or coolants are sometimes used.

Rubber-elastic material is preferably used for producing the vibration-damping element 21. Synthetic organic fibers or a highly stress-resistant plastic compound are particularly well suitable.

A nitrile-butadiene rubber (NBR) has very particularly proven itself as the rubber-elastic material. This rubber is used as a binder and is preferably provided with aramid fibers, in order to stamp the vibration-damping element 21 therefrom.

The vibration-damping element 21 has at least one thin elastic layer depending on the embodiment. However, the entire element 21 is preferably produced in one piece from only one elastic material.

The term elasticity is used here to describe the property of the material of the vibration-damping element 21. This element 21 is to react reversibly to a force acting thereon. The modulus of compression, or the elasticity of the material, is to be selected so that the relatively thin element 21 can absorb/damp the vibration energy of the described excitations. Energy-elastic or entropy-elastic materials (e.g., polymers) are particularly well suitable, which experience small dynamic compression deformations in the event of a force action through vibrations and then return practically without delay into the original state in each case.

In a further embodiment of the invention, the vibration-damping element 21 is assembled from a two-part, ring-shaped housing, which is filled in the interior with a viscous material. An element 21 which has the desired damping properties may also be provided in this way. Such an element 21 can also be referred to as a vibration-damping pressure cell.

The modulus of compression K is preferably less than 1 GPa and particularly preferably less than 0.1 GPa. The inverse value of the modulus of compression is referred to as the compressibility $\kappa$.

The vibration-damping elements 21 according to the invention have a rebound of greater than 50%. A rebound which is between 60 and 70% is ideal. These percentage specifications are based on the ASTM F 36 J standard. This standard relates to the short-term compressibility and restoring properties of the vibration-damping element 21 at room temperature.

Figure 3:
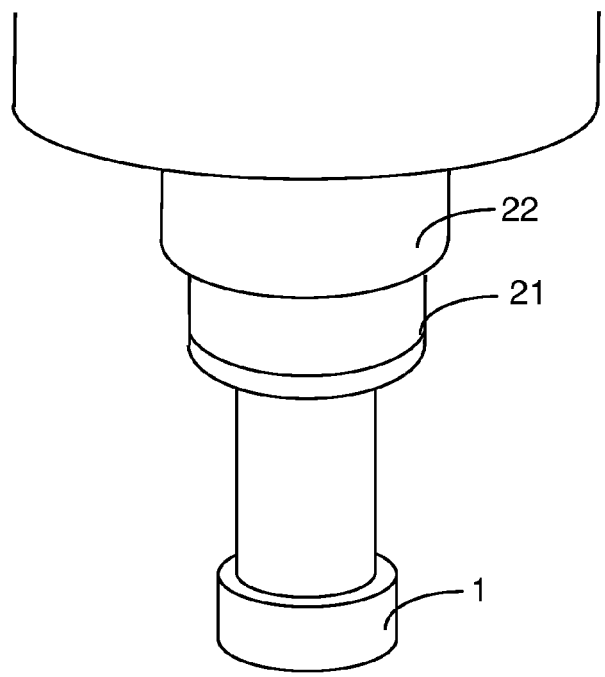
FIG. 3 shows a perspective view of a further chuck having damping means according to the invention.

A further embodiment of the invention is shown in FIG. 3. The chucking means 20 of a gear cutting machine are shown, which comprise an ring-shaped vibration-damping element 21, which is insertable in the area of the chucking means 20 during chucking of the workpiece 1 to be machined. The workpiece is a cylindrical gear 1 here. The chucking means 20 in turn comprise a pinion receptacle 22 having a central hole (not shown) and a lug part 23 having a central hole (not shown), both the pinion receptacle 22 and also the lug part 23 each in turn having a planar, ring-shaped flange surface (not shown).

The invention may be used on gear cutting machines 10 which execute a grinding, milling, or cutting action as the machining step during the machining of a gearwheel 1, or during the machining of the flanks of a gearwheel 1.

The invention claimed is:

1. A gearwheel cutting machine (10), which is designed for machining the tooth flanks of gearwheels (1), and which comprises chucking means (20) for chucking a workpiece (1) to be chucked and a gear cutting tool, characterized in that:
   the chucking means (20) comprises:
      a pinion receptacle (22) having a central hole (25) for receiving a shaft (2) of the workpiece (1), said pinion receptacle (22) defining a first planar, ring-shaped flange surface (28) facing toward a lug part (23);
      the lug part (23) having a central hole (24) for insertion over the shaft (2) of the workpiece (1), said lug part (23) defining a second, planar ring-shaped flange surface (29) facing toward the pinion receptacle (22); and
      a flat, ring-shaped vibration-damping element (21), which is situated as the only connection between the first planar, ring-shaped flange surface (28) and the second planar, ring-shaped flange surface (29), the lug part (23) being thus decoupled with respect to vibration from the pinion receptacle (22) and the gearwheel cutting machine (10).

2. The gearwheel cutting machine (10) according to claim 1, characterized in that the vibration-damping element (21) comprises a thin elastic layer, whose thickness is between 0.5 mm and 2 mm.

3. The gearwheel cutting machine (10) according to claim 1, characterized in that the vibration-damping element (21) has a ring shape having a central hole, the ratio between external diameter (DA) and internal diameter (DI) being $1.1 \leq DA/DI \leq 3.0$.

4. The gearwheel cutting machine (10) according to claim 1, characterized in that the vibration-damping element (21) has a thickness (D), which is between 0.5 mm and 2 mm.

* * * * *